United States Patent [19]

Massimino et al.

[11] Patent Number: 5,451,924

[45] Date of Patent: Sep. 19, 1995

[54] APPARATUS FOR PROVIDING SENSORY SUBSTITUTION OF FORCE FEEDBACK

[75] Inventors: Michael J. Massimino, Houston, Tex.; Thomas B. Sheridan, Newton, Mass.

[73] Assignee: Massachusetts Institute of Technology, Cambridge, Mass.

[21] Appl. No.: 4,761

[22] Filed: Jan. 14, 1993

[51] Int. Cl.$^6$ ............................................. G08B 3/00
[52] U.S. Cl. ................... 340/407.1; 340/407.2; 340/825.19; 340/680; 434/112; 434/116
[58] Field of Search ............. 340/407.1, 407.2, 825.19, 340/680; 341/21; 434/112, 113, 116

[56] References Cited

U.S. PATENT DOCUMENTS

| | | | |
|---|---|---|---|
| 3,157,853 | 11/1964 | Hirsch | 340/407.1 |
| 3,478,351 | 11/1969 | Fenton | 340/407.1 |
| 3,497,668 | 2/1970 | Hirsch | 340/407.1 |
| 4,244,120 | 1/1981 | Harris | 340/407.1 |
| 4,560,983 | 12/1985 | Williams | 340/407.1 |
| 4,655,673 | 4/1987 | Hawkes | 340/407.1 |

OTHER PUBLICATIONS

W. R. Ferrell, "Delayed Force Feedback," *Human Factors*, Oct. 1986, pp. 449–455.

N. J. M. Patrick "Design, Construction, and Testing of a Fingertip Tactile Display for Interaction with Virtual and Remote Environments," Aug. 1990.

R. T. Verrillo and S. C. Chamberlain, "The Effect of Neural Density and Contactor Surround on Vibrotactile Sensation Magnitude"; Perception and Psychophysics, vol. 11 (1B), pp. 117–120, 1972.

B. Scharf and A. J. M. Houtsma, "Audition II: Loudness, Pitch, Localization, Aural Distortion, Pathology," Handbook of Perception and Human Performance, Chapter 15, Eds. K. R. Boff, L. Kaufman, J. P. Thomas, N.Y. John Wiley and Sons (1986).

D. S. Alles, "Kinesthetic Feedback System for Amputees via the Tactile Sense," 2nd Canadian Medical and Biological Engineering Conf. Toronto, Canada, Sep. 9–11, 1968.

P. Bach-y-Rita, "Sensory Substitution in Rehabilitation," *Rehabilitation of the Neurological Patient*, Eds., L. Illis, M. Sedgwick, and H. Granville, Oxford: Blackwell Scientific, pp. 361–363, (1982).

A. K. Bejczy, R. S. Dotson, J. W. Brown and J. L. Lewis, "Manual Control of Manipulator Forces and Torques Using Graphic Display," in IEEE International Conference of Cybernetics and Society, Seattle, Wash. (1982), 691–698.

J. C. Bliss, "Artificial Sensory Systems; Prosthetic Aids for the Blind," in *Technology and the Neurologically Handicapped*, NASA Ames Research Center, pp. 141–150, 1975.

(List continued on next page.)

*Primary Examiner*—Donnie L. Crosland
*Attorney, Agent, or Firm*—Steven J. Weissburg

[57] ABSTRACT

A feedback apparatus for an operator to control an effector that is remote from the operator to interact with a remote environment has a local input device to be manipulated by the operator. Sensors in the effector's environment are capable of sensing the amplitude of forces arising between the effector and its environment, the direction of application of such forces, or both amplitude and direction. A feedback signal corresponding to such a component of the force, is generated and transmitted to the environment of the operator. The signal is transduced into an auditory sensory substitution signal to which the operator is sensitive. Sound production apparatus present the auditory signal to the operator. The full range of the force amplitude may be represented by a single, audio speaker. Auditory display elements may be stereo headphones or free standing audio speakers, numbering from one to many more than two. The location of the application of the force may also be specified by the location of audio speakers that generate signals corresponding to specific forces. Alternatively, the location may be specified by the frequency of an audio signal, or by the apparent location of an audio signal, as simulated by a combination of signals originating at different locations.

15 Claims, 5 Drawing Sheets

OTHER PUBLICATIONS

L. de Florenz, "True Blind Flight," *Journal of the Aeronautical Sciences*, vol. 3, pp. 168–170 (1936).

T. W. Forbes, "Auditory Signals for Instrument Flying," *Journal of the Aeronautical Sciences*, May, pp. 255–258 (1946).

S. Tachi, R. W. Mann and D. Rowell, "Quantitative Comparison of Alternative Sensory Displays for Mobility Aids for the Blind," IEEE Transaction in Biomedical Engineering, vol. 13 ME 30, No. 9, Sep. 1983, pp. 571–577.

S. F. Wiker and N. A. Duffie, "Grasp Force Control in Telemanipulation," *Annual NASA & USAF Space Operations Automation and Robotics Conference*, Albuquerque, N. Mex. Jun. 25–28, 1990.

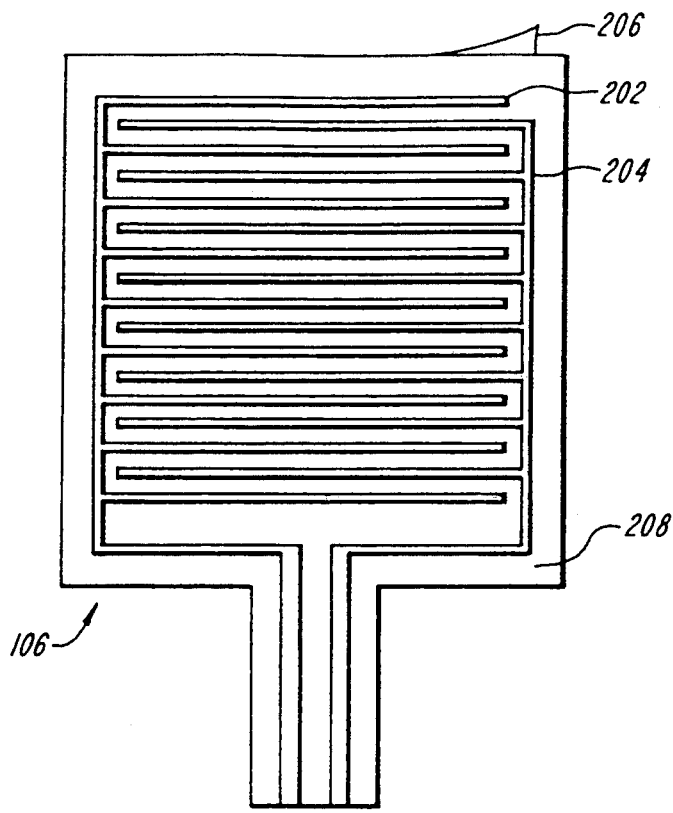
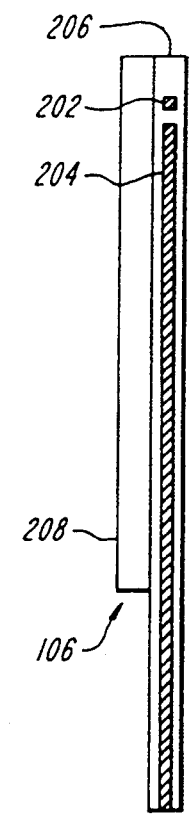
FIG. 2A   FIG. 2B
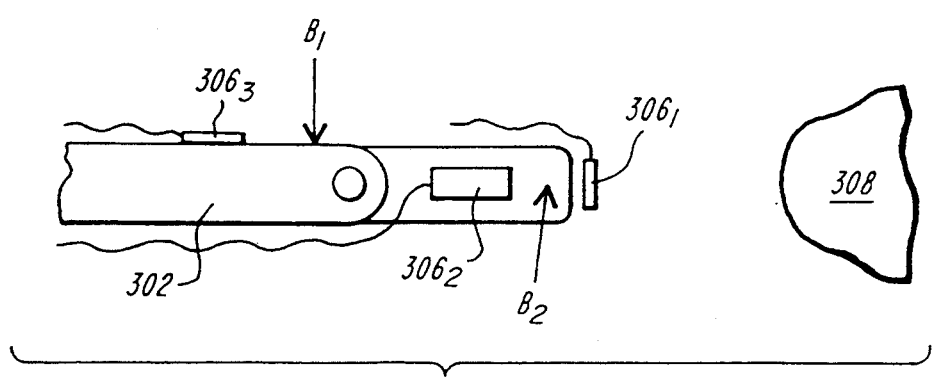
FIG. 3

APPARATUS FOR PROVIDING SENSORY SUBSTITUTION OF FORCE FEEDBACK

U.S. GOVERNMENT INTEREST

The U.S. Government has certain rights in this invention pursuant to Contract No. NGT-50145, awarded by NASA and contract/Grant no. 956892 awarded by California Institute of Technology Jet Propulsion Lab.

The invention relates in general to the field of non-visual, non-reactive displays of information. More particularly, the invention relates to the display of information, such as force feedback, using non reactive sensory substitution displays, such as vibrotactile and auditory displays.

BACKGROUND

For many operations, a human operator manipulates an input device in an environment local to the operator, and the effect of the manipulation takes place in a remote environment, by virtue of the actions of an effector located in the remote environment. Such operations include the manipulation of effectors: in outer space by ground based operators; in hazardous environments, such as a nuclear reactor core, by operators a safe distance away; attached to construction equipment, such as cranes by operators distant from the crane. To facilitate the control of the effector, various forms of feedback have been used. Visual feedback, typically using a video camera and visual display device is very helpful. However, in many situations, visual feedback is not available, such as when the remote environment is dark or murky, for instance below water. Visual feedback can be degraded due to the various complexities involved in video transmission. Further, video transmission requires a rather large bandwidth and relatively expensive equipment. Also, due to the arrangement of the effector with respect to the remote environment, the view of the visual capture device, such as a camera, is often blocked by intervening elements.

It is also common to provide a physically reactive force feedback. In such an arrangement, the effector is provided with an array of force sensors, which are designed and located to measure the forces applied to the effector by interaction with its environment. These forces are transduced and transmitted to the environment of the local operator, where they are retransduced by motor and gear systems into forces that are applied to the input apparatus that the operator uses. Thus, the operator "feels" the forces that the effector feels, to some degree depending on the fidelity of the force sensing and reproduction scheme.

Force information is useful for several reasons. It facilitates governing the forces applied by the effector, either to avoid excessive stresses or to produce a desired movement of an object, or to minimize energy expenditure. It also facilitates estimating mass, frictional resistance, or other properties of objects in the remote environment in order to predict their behavior. It also provides information about contact with objects or with features of the environment, as in searching when visual information is unavailable. In some cases, it also guides the operator's body (typically the hand) to an appropriate location.

Use of reactive force feedback has drawbacks. The apparatus required to reproduce the force at the local environment of the operator may be costly, complicated and bulky. Further, the force fed back to the operator's hand acts as an additional input to the input device, thereby having an effect on the remote effector. It is also often desirable to amplify the force feedback signal, to enable sensing modest or delicate forces. If the gain on the feedback signal is large, in order to provide needed sensitivity, a small force at a remote location would be presented as a large force to the operator. This would impose a large force on the operator and could make the input controller more difficult to move. Thus the task would be made more physically difficult, the operation would be slowed down, and the rate of operator fatigue would be increased. If gains are made excessively high, instability could arise.

Some force feedback systems present the feedback with a time delay. Time delays on the order of several seconds are common in connection with communication to outer space, even with the signal being transmitted at the speed of radio waves. It has generally been found that reactive feedback in the presence of time delays can not be used effectively because instabilities quickly arise. See generally, W. R. Ferrel, "Delayed Force Feedback,: *Human Factors*, October 1986, pp. 449–455.

It has been noted that if reactive force feedback is provided to the operator, not to the hand that is applying the force, but to the other hand, the operator gains an advantage. See S. Weissenberger and T. B. Sheridan, "Dynamics of human operator control systems using tactile feedback," *A.S.M.E. Transactions (J. Basic Eng.)*, vol. 84, pp. 297–301 (1962). However, the fact that the feedback is provided to another limb, and, in fact, an oppositely disposed limb, leaves room for improvement.

It has also been attempted to provide force feedback through the visual modality, such as by using a visual display that indicates force, either through numbers, or a pictorial representation. However, the visual modality is typically heavily burdened by other demands. It has been found that such methods typically overload the operator's ability to process visually perceived information, thus leading to degraded or unacceptable performance.

There are other situations where feedback of force is desirable, which are not obviously within the class of remote effector applications. For instance, in microsurgery, or any micromanipulation, the operator manipulates an input device with a resultant motion by an effector, perhaps very close to the operator, yet connected by a linkage (mechanical, electrical, electromechanical, or other) that effectively distances the operator from the resultant activity as if the operator were far away. Such microsurgery could be conducted over distances of either inches or miles, with the appropriate visual feedback tools. Another instance relates to the control of artificial limbs, for instance an artificial arm or hand. One type of artificial limb is referred to as myeoelectric. Such a device is connected to the receive impulses from the nerves of the muscles remaining in the stump of the limb. The patient still has the ability to move these muscles, thereby generating electric signals, which can be used as inputs to the prosthesis. It would also be helpful if the patient were aware of the force field in which the prosthesis fingers, hand, wrist, elbow, etc. operates. Force related cues could provide valuable information to the patient. However, reactive force feedback is not practical in such a situation because the user has no sensation in the artificial limb.

Previous work of the present inventor has indicated that a vibrotactile display can be used to indicate whether or not a remote effector has come into contact with an object in the remote environment. In that work, a sensor/transducer carried by an effector was connected to a computer, which generated a signal to a vibrating unit fixed to the hand of the user that guided the input device. The computer generated signal was not related in any way to the magnitude of the force experienced by the sensor, other than that the signal indicated a positive force if the force exceeded the minimal sensitivity threshold of the sensor. No information was provided to the user about the magnitude or the direction of the force. See N. J. M. Patrick "Design, Construction, and Testing of a Fingertip Tactile Display for Interaction with Virtual and Remote Environments," submitted in partial fulfillment of the requirements for the degree of Master of Science in Mechanical Engineering at the Massachusetts Institute of Technology pp. 2 and 63–67 (1990), citing the present inventor's unpublished research. The entire document is hereby incorporated fully herein by reference. The principal focus of the Patrick work was using a vibrotactile display to track the location of the user's fingers relative to desired locations, particularly in the context of a virtual reality glove manipulation. The signal generated by the display device was a vibration having an amplitude linearly related to the distance between the location of the fingers and the desired location.

OBJECTS

An object of the invention is thus to provide a non-visual, non-reactive sensory substitution force feedback signal for use in connection with remote effector applications, which does not overload the capabilities of the operator and which remains stable even in the presence of time delays. A further object is to provide the advantages of force feedback without the burdens of reactive force feedback, such as an expensive and heavy or complicated effector and input device and instability in the presence of time delays. Another object of the invention is to facilitate increasing the gain of a force feedback system, in connection with the sensing of very small forces, without unduly increasing the resistance of the input device to operator control. Yet another object of the invention is to provide force feedback that is relatively inexpensive and robust and requires a minimal bandwidth to transmit the signal from the remote location to the local environment.

SUMMARY

A preferred embodiment of the invention is a feedback apparatus for an operator to control an effector that is remote from the operator to interact with a remote environment. The operator manipulates a local input device. The feedback apparatus includes sensors in the effector's environment capable of sensing the amplitude of forces arising between the effector and its environment, the direction of application of such forces, or both amplitude and direction. Means are provided for generating a feedback signal corresponding to such a component of the force, transmitting the feedback signal to the environment of the operator and for transducing the signal into a non-visual, non-reactive sensory substitution signal to which the operator is sensitive. For example, the sensory substitution signal may be auditory or vibrotactile. The invention also includes means for presenting the sensory substitution signal to a sensory system of the operator that is receptive to the signal. The full range of the force amplitude may be represented by a single, unitary display means, such as a mechanical vibrator or an audio speaker.

In connection with the foregoing embodiment, vibrotactile display elements can be located on the operator's limbs, such as on the hand, fingers, arms, legs, feet, etc. Auditory display elements may be stereo headphones or free standing audio speakers, numbering from one to many more than two.

According to another preferred embodiment, the invention includes an apparatus to generate a feedback signal such as discussed above, that corresponds to the location, relative to the effector and its environment, of the force between the effector and its environment. The location may be specified by the location of a vibrotactile display on the operator's body, or the location of audio speakers that generate signals corresponding to specific forces. Alternatively, the location may be specified by the frequency of an audio signal, or by the apparent location of an audio signal, as simulated by a combination of signals originating at different locations.

Another preferred embodiment of the invention is a system, incorporating any of the feedback apparatus as discussed above, further including an effector and an input device. Additionally, the system may include a visual feedback system, such as a video camera at the effector's location and a playback device at the operator's location.

BRIEF DESCRIPTION OF THE FIGURES

These and other features, aspects, and advantages of the present invention will become better understood with regard to the following description, appended claims and accompanying drawings, where:

FIG. 2A is a schematic representation of a force sensing resistor that may be used with the invention in plan view.

FIG. 2B is a side cross-sectional view of the force sensing resistor shown in FIG. 2A.

FIG. 3 is a schematic representation of a number of force sensing resistors arrayed on a portion of an effector.

DETAILED DESCRIPTION OF PREFERRED EMBODIMENTS OF THE INVENTION

Figure 1:
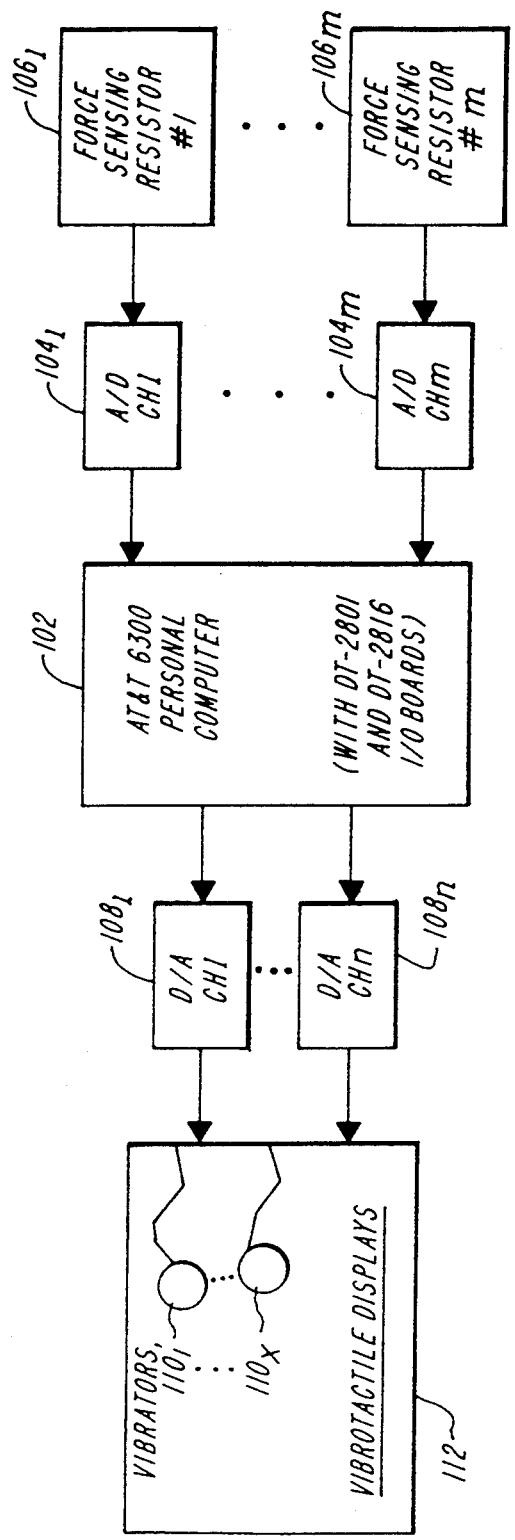
FIG. 1 is a schematic representation of an embodiment of the invention using a vibrotactile display.

In a preferred embodiment, the invention is an apparatus for providing force feedback through a sensory substitution display, for instance a vibrotactile display with a change in the amplitude of the vibration representing a change in the magnitude of the force. A representative embodiment of the invention is shown schematically in FIG. 1. A number of force sensors $106_1$–$106_m$ are used, the number depending on the effector, the environment and the specificity of the information required by the task at hand. Suitable force sensors are described below. For each force sensor 106, an analog to digital converter (A/D) $104_{1-m}$ is provided. For instance, the A/D convertors can be implemented by a Data Translation DT-2801 input-output (I/O) board with sixteen analog to digital (A/D) channels and two digital to analog (D/A) channels. The board is installed in a programmable general purpose digital computer processor, such as an AT&T 6300 Personal Computer, which is used to process and thus augment the digital signals generated by the A/D converters 104. A number of digital to analog converters $108_{1-n}$ are connected to the output of the processor 102. Some of the D/A converters 108 may be implemented by an output board such as a Data Translation DT-2816 output board. The number of A/D channels used for a given application correspond to the number of force sensors needed for the task. The number of D/A channels used depends on the number of display elements 110. There need not be the same number of D/A channels as A/D channels, or as individual sensor signals.

The D/A channels 108 on the DT-2801 and DT-2816 output boards stimulate a number of vibrators $110_{1-x}$ that together constitute the vibrotactile display 112 and present the vibrotactile stimuli to the operator. The vibrators are attached to selected parts of the operator's body, as described below.

Suitable force sensors are force sensing resistors ("fsr's"), as shown schematically in FIGS. 2A and 2B, such as made by Interlink Electronics of Santa Barbara Calif. As described in the Product Design Guide, available from Interlink Electronics, the fsr 106 is a polymer thick film device which exhibits a decreasing resistance with increasing force applied normal to the device surface. A basic fsr has two polymer sheets laminated together: one sheet 206 is coated with interdigitating electrodes 202 and 204. The other sheet 208 is coated with a proprietary semiconductive material. When a force is applied to the fsr 106, the semiconductive material shunts the interdigitating electrodes, causing the resistance to drop. Such resistors are described more fully at "Touch the Future Through Force Sensing Resistors from Interlink Electronics," also available from Interlink Electronics, which is incorporated fully herein by reference. Fsr's are available in a variety of shapes and sizes. A typical range is an area of from 0.5×0.5 cm (0.2×0.2 in.) to 56×80 cm. (22×32 in.). Virtually any shape desireable is available, including squares, circles, etc. The sensitivity of such sensors ranges from ten grams to twenty kilograms.

The fsr's described above are useful for sensing forces that are normal to the surface to which the sensor is attached. For instance, as shown in FIG. 3, if such a sensor $306_1$ were applied to the tip of a fingerlike effector 302, it would be sensitive to forces experienced by the effector when pushing parallel to its long axis against an object 308, analogous to a human finger pushing a button. It is also possible to use other types of sensors $306_2$, such as strain gauges, mounted along the side of such a finger-like effector, to sense and thus transduce bending stresses in the effector arising due to forces applied normal to the long axis of the effector, for instance parallel to arrows $B_1$ and $B_1$.

Figure 4:
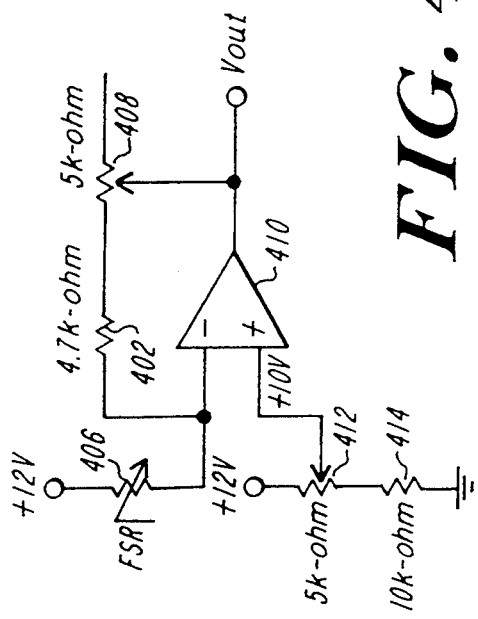
FIG. 4 is a schematic representation of an electronic circuit that can be used to amplify the signal generated by a force sensing resistor.

It is necessary to provide an electric circuit that transduces the voltage output from the fsr's 106 into a usefully calibrated voltage spectrum. For example, a typical effector may be able to apply forces to the environment ranging from zero to ten lbs-f. With a current through the fsr limited to approximately 1 to 2 mA, an appropriate circuit is shown in FIG. 4.

The power supply provides +12 volts and ground terminals. (A−12 V terminal may also be provided.) The resistors 414 and 412, a trim potentiometer serve as a +10 volt power source to the positive input terminal of the op-amp 410. To accomplish this the voltage into the op-amp is measured from ground up to the trim-potentiometer , and the trim-potentiometer is adjusted until the voltage is exactly 10 volts.

The properties of op-amps dictate that the voltage at the negative terminal is +10 V, since the voltage at the positive terminal is set to be +10 V. The voltage across the fsr 406 is then 2 V. The resistance of each fsr may range, for example, from over 1 M-ohm at zero force to a smaller resistance at maximum force. For a typical fsr the minimum resistance is approximately 1500 ohms at five pounds of force. Thus the current through the fsr can range from approximately 0 A at zero force to approximately 1.3 mA at high force, which is within the suggested range for fsr current.

For such an fsr 406, the circuit having a 4.7 k-ohm resistor 402 in series with a 0–5 k-ohm trim potentiometer 408 as shown in the upper part of the circuit diagram, allows voltage swings at $V_{out}$ from 10 V when no force is present to 0 V when a five pound force is present. These resistance and trim potentiometer magnitudes are dependent on the characteristics of each individual fsr 406. The voltage equation for the upper portion of the circuit is $$12V = V_{fsr} + V_1 + V_2 + V_{out} \qquad (1)$$

where $V_{fsr}$ is the voltage across the fsr, which equals 2 V; $V_1$ is the voltage across resistor 402, $V_2$ is the voltage across the in loop (left) portion of the potentiometer 408; and $V_{out}$ is the op-amp output voltage, which corresponds to the voltage across the portion of the trim potentiometer 408 not connected in series with the resistor 402. The above equation (1) then reduces to $$V_1 + V_2 + V_{out} = 10V. \qquad (2)$$

Since an op-amp draws no current, the current through the resistors 406, 402 and 408 equals $$(V_{fsr}/R_{fsr}) = (2V/R_{fsr}), \qquad (3)$$

where $R_{fsr}$ is the resistance of the fsr 406 measured at any particular time. The equation (3) reduces to $$V_{out} = 10V - (4.7k\text{-}ohm)(2V/R_{fsr}) - (R_2)(2V/R_{fsr}). \qquad (4)$$

When there is no force at the fsr 406, $R_{fsr}$ is very large and $V_{out}$ equals ten volts. The correct value to which the trim potentiometer 408 is adjusted depends on the characteristics of the particular fsr 406. The fsr resistance value at maximum force is substituted for $R_{fsr}$ and $V_{out}$ is set to be zero. The trim potentiometer 408 is tuned to insure that $V_{out}$ is zero volts at maximum force, giving a swing of 10 V to zero V for changes in force from zero pounds to maximum force. For example, if $R_{fsr}$ were 1400 k-ohm at maximum force, the trim potentiometer 408 resistance in series with the 4.7 k-ohm resistor 402 would be set to approximately 2.3 k-ohm, giving a $V_{out}$ of zero at maximum force.

For a typical display, the number of fsr's used may range from two to nine, however, even more sensors can be used. A suitable vibrotactile display electronics unit is described in detail by Patrick, cited above. Briefly, the vibrotactile display, consists of vibrating voice coils. Suitable vibrators are available from Audiological Engineering Corporation in Somerville, Mass. The displays vibrate at 250 Hz, which is the frequency at which the Pacinian corpuscles (the rapidly adapting vibration detectors in the skin) have their lowest threshold. The resonant frequency of the vibrators is also 250 Hz. Therefore the highest efficiency of voltage into the display and vibration amplitude is achieved. Suitable circuitry is provided as part of vibrotactile display 112 to convert the voltage output from D/A convertors 108 into a periodic signal suitable for excitation of vibrating elements 110. Design of such a circuit is within the competence of one of ordinary skill in the art and is described fully in Patrick, cited above.

Figure 7:
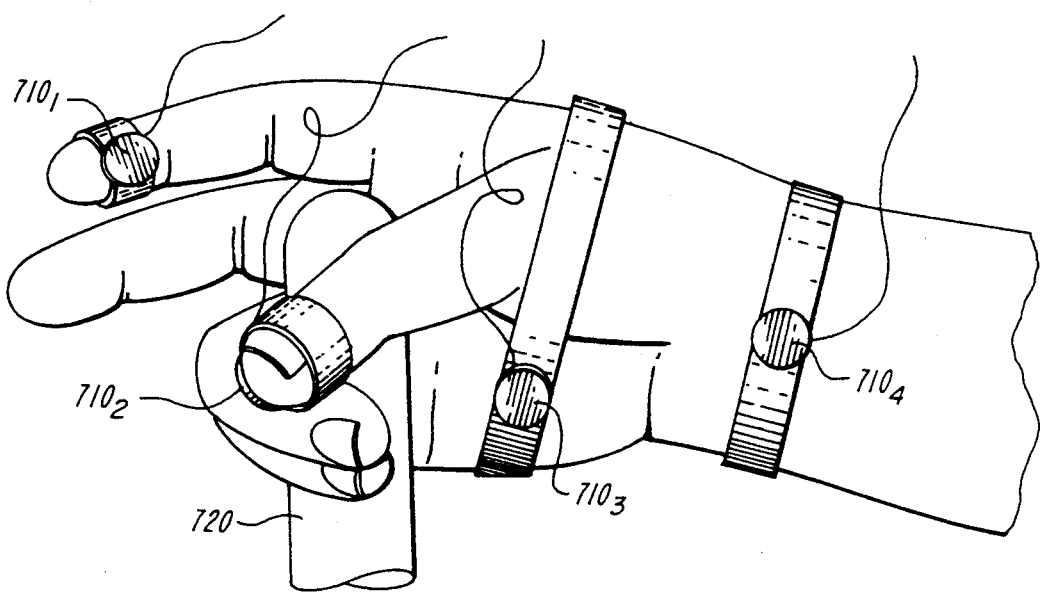
FIG. 7 is a schematic representation of a number of vibrotactile display elements arrayed on an operator's hand.

As shown schematically in FIG. 7, the vibrotactile displays may be placed on various body locations, such as on the fingertips $710_1$ and $710_2$, palm of the hand $710_3$, and wrist $710_4$, depending on the number and location of critical forces present for an experimental task. A simple joystick type input device 720 is shown in FIG. 7, however, more sophisticated input devices can be used, such as a joystick in combination with a pair of spring loaded arms or a virtual reality type glove, such as are available from VPL Research of California, under the tradename "Dataglove."

Placement of the vibrating elements on the fingertips and palms is for two reasons: 1) they are the regions of the skin which are most sensitive to vibrotactile stimulation (see Wilska, A. (1954). "On the Vibrational Sensitivity in Different Regions of the Body Surface," *Acta Physiologica Scandinavica*, Vol. 31, pp. 285–289) and 2) they allow the displays to be placed in positions which allowed easy transformations through sensory substitution for the operator to identify the position of the forces exerted at the remote effector location. The vibrators may be held in place on the skin using nylon hook and loop fasteners.

According to a preferred embodiment, the magnitude of vibration depends on the magnitude of the force being displayed by the vibrating element. Research studies have determined relationships for the perceived magnitude of a vibrotactile stimulus as a function of the physical intensity of the stimulus. The physical intensity is the displacement of the vibrator which is usually measured in microns. A study by Verrillo, R. T. and Chamberlain, S. C., "The effect of Neural Density and Contactor Surround on Vibrotactile Sensation Magnitude.," *Perception and Psychophysics*, Vol. 11(1B), pp. 117-120 (1972) (which is incorporated fully herein by reference) shows a relationship between displacement and sensation magnitude according to the function:

$$(SM)^{0.48} = k*D, \qquad (4)$$

where SM is sensation magnitude, and D is displacement in db and k is a constant determined by measurement. Db's are related to displacement in microns by:

$$db = 20 log(P), \qquad (5)$$

where P is the displacement in microns. The relationship between voltage in and displacement P can be calibrated. Converting displacement in db to displacement in microns, applying the $V_{in}$ to displacement function, and linearly scaling subjective magnitude between 0 and 5 pounds for x and z-directions and between 0 an 10 pounds for the y-direction, gives the following relationships between force and input voltage:

$$V_{in} = 0.0493 * 10^{0.748 * force^{0.48}} - 0.0493 \qquad (6)$$

for forces in x and z-directions and $$V_{in} = 0.0493 * 10^{0.536 * force^{0.48}} - 0.0493 \qquad (7)$$

for forces in the y-direction. The (−0.0493) is included so that zero force would correspond to zero volts. The relationship allow a change in force to be perceived as a change in the magnitude of the vibrotactile stimulus and are used in software routines that control the processing by the processor 102. The software is relatively straightforward and is well within the scope of the skill of one familiar with the art.

The specific conformation of the implementation of the invention depends on the task to be accomplished, which in turn governs the shape, degrees of freedom and capabilities of the effector as well as the control mechanism. For instance, a typical effector is shown schematically in FIG. 6. The effector has many degrees of freedom ("dof") plus a gripping capability. Three of the degrees of freedom, designated X, Y and Z, identify arm translation. One ("Azimuth") identifies arm rotation. Another ("Elevate") identifies gripper rotary elevation and another ("Twist") specifies gripper twist. Jaw grasping is indicated at "Jaw." The arm can also rotate about the X, Y and Z axes.

Force sensing resistors may be placed at various locations on the effector. For instance, as shown schematically in FIG. 6, sensors $606_1$ and $606_2$ are located on the inside, or grasping surfaces of the jaw members. Such sensors would provide information about the force of grasping, such as for holding delicate objects. Sensors $606_5$ and $606_6$ are located on the outside surfaces of the jaw members. Such sensors would provide information concerning the jaw contacting the environment, or the amount of spreading forces that the jaw members may be providing. Sensors $606_3$ and $606_4$ are located on the end surfaces of the jaw members. These sensors would provide information concerning the force with which the gripper may be pushing against an object in the X direction directly ahead of it. Sensors $606_7$, $606_8$ and $606_9$ are located on the arm of the effector. These sensors may be a different sort of sensor, such as a strain gauge, that measure bending strains in the arm. They may provide information concerning the downward force being applied to the arm, such as pertaining to the weight of an object being grasped by the jaws.

Signals from the individual sensors may combine to provide information pertaining to the direction of an applied force. For instance, if both sensors $606_3$ and $606_5$ indicate a force of certain respective magnitudes, an operator might conclude that the gripper member was pushing against a corner, or portion of the environment having two surfaces at an angle to each other. The amount of information that the sensors can provide depends to some extent on the familiarity the operator has with the environment in which the effector operates. For instance, if an effector is operating in an environment of known configuration, but having some portions for which available visual feedback is obstructed, much information can be gained from knowing which portions of the effector are contacting the environment. Such situations might include locations associated with a nuclear reactor, or certain medical situations where other imaging has already provided a "geography" of the locus of interest.

Figure 6:
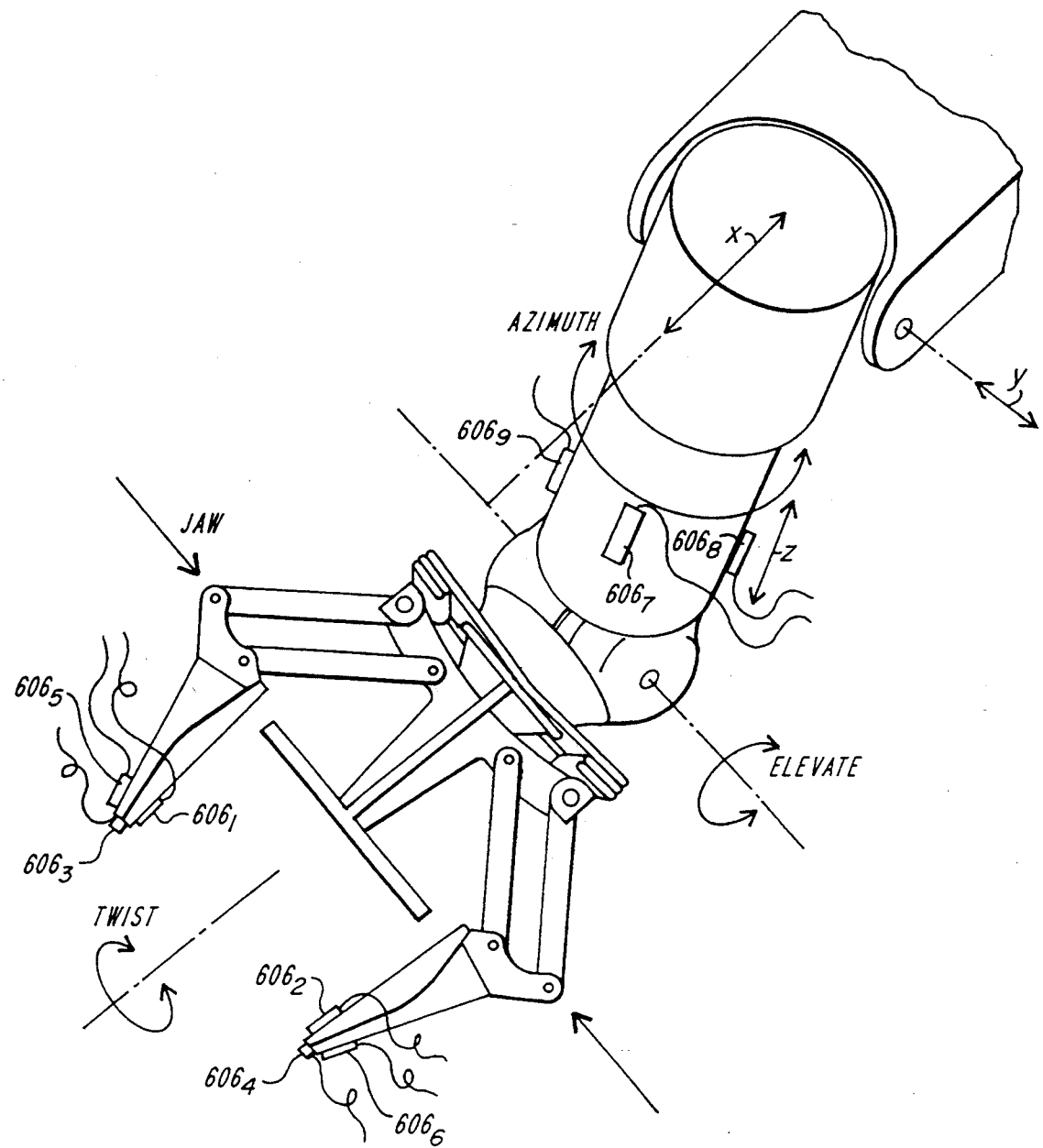
FIG. 6 is a schematic representation of a number of force sensing resistors arrayed on another effector.

The manner in which signals from the sensors are presented to the operator also depends on the situation. The system should be designed so that the operator can associate the stimulus signals with the environment they simulate. For instance, as shown in FIG. 7, vibrotactile display element $710_1$, located on the inside of the operator's index finger, might be driven to represent forces sensed by fsr $606_1$ as shown in FIG. 6, on the inside of the gripper member. Similarly, display element $710_2$, located on the fleshy surface of the operator's thumb, might be driven to represent forces sensed by fsr $606_2$, located on the inside of the opposite gripper member. Sensor element $710_3$, located on the operator's palm, might be driven to represent forces sensed by fsr $606_6$, located on the outside of one gripper member, with another display element, not shown, on the back of the user's hand, driven to represent the force experienced by fsr $606_5$, on the outside of the other gripper member. Finally, display element $710_4$, located on the user's wrist, may be driven to represent the force experienced by one or a combination of strain gauges $606_7$, $606_8$ and $606_9$, thereby providing information about the weight of an object grasped by the effector.

The choice of association between locations of fsr sensors on the effector and display elements used by the operator is virtually limitless. The designer should consider the sensitivity of the portion of the body contacting the display. The designer should also consider similarities in the conformation of the effector and the body member, so that it is within the user's capability to make the association between the display and the stimulation. The number and complexity of display elements must not be so great as to overload the user's ability to process the information presented.

As is mentioned above, it is helpful to vary the vibrational intensity of the display elements relative to the force sensed in such away that the user perceives a doubling of the sensation when a doubling of the force arises. Thus, a linear relation between force and vibrational amplitude is usually not warranted, as discussed in Verrillo and Chamberlain [1972], cited above. Rather a relation that is linear between sensation magnitude and force is preferred.

Figure 5:
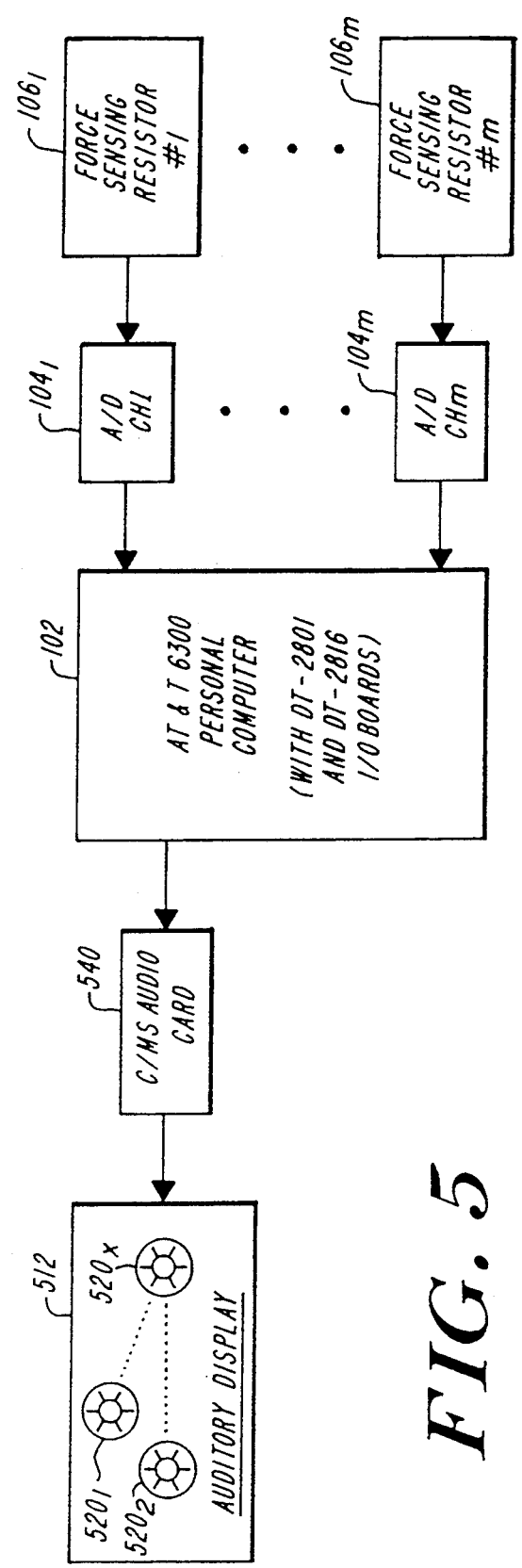
FIG. 5 is a schematic representation of an embodiment of the invention using an auditory display.

The foregoing has discussed using a vibrotactile sensory modality as a substitution for force feedback in connection with a master slave operator. It is also possible to use the auditory modality as a substitution for force feedback. Such use is shown schematically with respect to FIG. 5. The system is the same as the system shown in FIG. 1, with respect to the tactile modality, except that the display is auditory rather than vibrotactile. Like elements in both systems are identified with like reference numerals. The common elements include the array of force sensing resistors 106, the analog to digital channels 104 and the programmable digital computer 102 equipped with input and output boards. An additional element is a C/MS PC music audio card 540, available from Creative Labs, Inc., of San Jose, Calif. The card can be used to independently control up to twelve different audio signals. Each signal has a single square wave frequency. The card has 4 bits for amplitude control of a nominally right channel and 4 bits for amplitude control of a nominally left channel for each of the 12 signals. This enables stereo presentation. There are also eight bits for frequency control of each of the 12 signals, and 3 bits for octave control. The frequency and octave ranges produce a frequency range from 20 to 7000 Hz. This range contains the frequencies at which the human ear is most sensitive and the fundamental frequencies that correspond to all of the notes on a piano keyboard. The capabilities of the board allow a change in force at any of the fsr's 106 to be presented to the subject with frequency and apparent location and/or frequency of the tone (discussed below) identifying the position of the force, and with amplitude (loudness) of the tone representing the magnitude of the force.

Intensity is a physical property of sound (the rate of energy transfer), whereas loudness is a subjective psychophysical property. Loudness is the sensation magnitude or perceived intensity of a sound, and it increases with sound intensity (see generally Boff, K. R., and Lincoln, J. E., *Engineering Data Compendium: Human Perception and Performance*. AAMRL, Wright-Patterson AFB, OH (1988)). Changes in loudness make perceptual differences to humans, and the design of the auditory loudness display includes the determination of a relationship to represent a change in force as a change in loudness, rather than a change in sound intensity. This is directly analogous to the care taken to insure a linear relation between tactile sensor magnitude and force.

Several experimental studies have been conducted to determine how loudness depends on stimulus intensity or level. Most of these studies were conducted with a 1,000 Hz tone, since this is the frequency at which the ears have the lowest threshold when earphones are worn (see generally Scharf, B. and Buus, Soren, "Audition I: Stimulus, Physiology, Thresholds," *Handbook of Perception and Human Performance*, Chapter 14. Eds. K. R. Boff, L. Kaufman, and J. P. Thomas. New York: John Wiley and Sons (1986)). For these reasons, a 1000 Hz tone is selected for the invention to represent forces whenever practical. However, for any specific operator and operator environment, other frequencies may be more useful, as one of ordinary skill in the art will readily appreciate. The relationship between loudness and sound pressure level in decibels (Scharf, B. and Houtsma, A. J. M., "Audition II: Loudness, Pitch, Localization, Aural Distortion, Pathology," *Handbook of Perception and Human Performance*, Chapter 15. Eds. K. R. Boff, L. Kaufman, and J. P. Thomas, New York: John Wiley and Sons (1986)) follows the relationship:

$$1 = 0.0474 * 10^{0.0315 s} \tag{8}$$

where 1 represents loudness in sones and s represents sound pressure level in dbs, with R equal to 1.00. The value R is a measure of the closeness of the fit between a curve and the data it represents. A value for R of 1.00 indicates the closest fit. The auditory signal is presented to the operator through speakers $520_1$, $520_2$, ... $520_x$, with x running from zero. It is convenient to configure the speakers 520 as a pair of headphones, however, other arrangements with more speakers are possible.

For instance, the operator can be surrounded with a number of speakers, all in the same general plane, or in several planes, with some speakers above and some below the operator. The limit on the number and placement of the speakers must be determined by cost and computational limitations, the complexity and importance of the task to be performed, as well as the operator's capacity to process the variety of acoustic signals produced by the speakers. If more than two speakers are used, it is also important to locate the speakers in a way that corresponds to the arrangement of force sensors, the effector, and the effector environment. In the discussion that follows, the two speaker example of a pair of headphones is used, however, the generality of the invention is not so limited, and those of ordinary skill in the art will readily understand the means by which the apparatus described can be modified to accommodate numerous speakers.

Suitable headphone speakers are available as small earplugs from Radio Shack, which fit snugly into an operator's ears, having a frequency response range of sixteen Hz to twenty-two thousand Hz. Ear muffs, such as sold under the tradename Viking by the Bilsom Safety Products Company of Sterling, Va., may be worn over the earplugs to cut down on environmental noise and to increase the efficiency of the auditory stimulus.

The C/MS card 540 has four bits for loudness control through a loudness control register. Therefore, the input value to the loudness control register may range from zero to fifteen in decimal units, where zero corresponds to zero loudness and fifteen corresponds to maximum loudness. The auditory display is calibrated with the C/MS card, and the relationship between the input value for the loudness control register in decimal units for the C/MS card and the corresponding db sound pressure level ("SPL") output from the ear plugs is according to the following:

$$a = 1.97 * c^{0.6} \tag{9}$$

where $a$ is auditory intensity (db SPL), $c$ is input value to the card loudness control register, in decimals and $R = 1.00$. Sound pressure level db in decibels may be related to sound pressure P in micropascals by the following:

$$db = 20 * \log(P/20). \tag{10}$$

Converting sound pressure level from equation (9) in db to sound pressure level in micropascals provides:

$$L = k * (p^{0.6}) \tag{11}$$

where L is loudness in sones, $k = 0.01$, and P is the sound pressure in micropascals. The sone is arbitrarily scaled and is defined as a unit of loudness such that a 1,000 Hz tone heard binaurally at 40 db has a loudness of one sone, according to the method of Scharf and Houtsma, 1986 cited above.

The C/MS board 540 has four bits for volume control, i.e., sixteen different levels for the volume register value. Further, sound pressure from the board is linearly proportional to the volume register value. Therefore volume register value is substituted for sound pressure, P, in the above mentioned equation no. (11) and allowed to vary between zero and fifteen. Further, loudness in sones is linearly scaled to force between zero and five pounds for translation forces in two dimensions of a plane, designated x and z, and from zero to ten pounds for translation forces perpendicular to the plane, designated in the y direction. This produces an equation:

$$F = k * (VRV^{0.6}) \tag{12}$$

where F is the force in pounds, VRV is the volume register value in decimal numbers, and k is a constant to be determined and dependent on the force range. By letting zero force be represented by zero volume register value and five or ten pounds force (depending on the degree of freedom) be represented by a volume register value of 15, k is estimated at 0.95 for 0 to 5 pounds and at 1.97 for 0 to 10 pounds. These functions relate changes in the volume register value of the C/MS board, i.e., a change in sound pressure, to a change in the perceived force by varying the perceived loudness of the tone. It is then possible to develop the relationship that sets the loudness level of the tone based on the force reading on an fsr 106. This relationship is as follows, for the x and z direction forces:

$$VRV(decimal) = 1.026 * force^{1.67} \tag{13}$$

where $R = 1.00$. The relationship for the y direction forces is:

$$VRV(decimal) = 0.323 * force^{1.67}. \tag{14}$$

If equations (13) and (14) were used as presented, the volume register values would be zero (producing no sound at all) until the force equals 0.985 pounds in the x or z directions and 1.97 pounds in the y direction. The minimum force registrable by a typical fsr 106, however, is 0.01 pounds (for the fsr's identified above). Thus, in order to have the display provide stimulation at low force levels, the equations (13) and (14) can be shifted to provide an auditory stimulus at lowest loudness for the minimum force measurable. The following equations may be used:

$$VRV(decimal) = 1.026 * ((force + 0.97972)^{1.67}) \tag{15}$$

and $$VRV(decimal) = 0.323 * (force + 1.96503)^{1.67}). \tag{16}$$

At low force levels, the display may hiss, fluttering between on and off. To overcome this problem, a digital filter may be used to average a number of previous readings, for instance four, from an fsr 106, to determine the force value. Since the sampling rate is 60 Hz, this does not significantly slow down the effective sampling rate.

Figure 8:
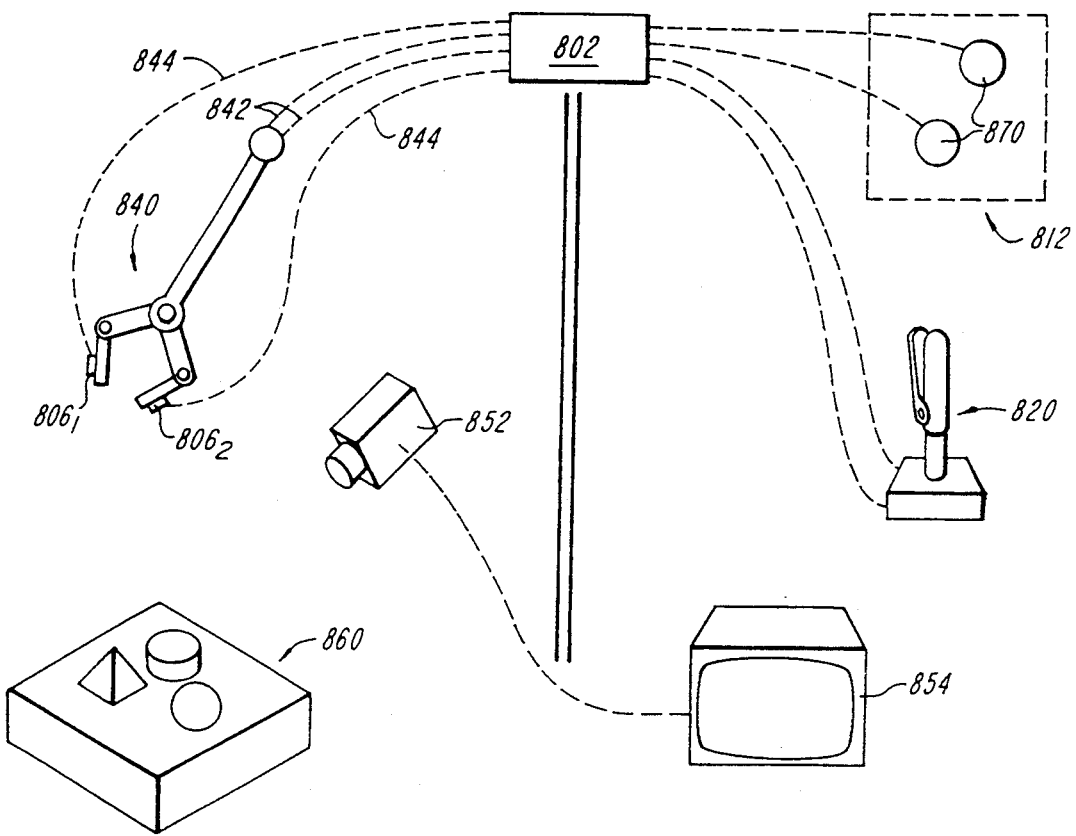
FIG. 8 is a schematic representation showing the local environment of an operator and the distant environment of the effector, with a visual feedback mechanism and means for controlling the effector and sensors.

The overall set up for a generic sensory substitution display for force feedback is shown schematically in FIG. 8. An effector 840 is equipped with fsr's 806. The effector operates within an environment 860. The effector is connected by some appropriate channel, indicated by dotted lines 842, to a control device 802, such as a properly programmed digital computer. The fsr's 806 are also connected through a channel, indicated by dotted lines 844, to a control device, which may conveniently be the same control device 802 as controls the effector 840, or it may be another control device more specially tailored to the control of the fsr's.

The channel may be a plurality of electrical wires, or fiber optic cables. Alternatively, the channel may be a radio frequency (or light frequency, i.e. laser) channel, for instance as may be used to communicate with an effector located on a satellite in outer space, controlled by an operator on earth.

Visual feedback is provided by image capture device 852, for instance a video camera, connected through an appropriate channel to an image display device 854, such as a cathode ray tube, located in the local environment of the operator.

At the local environment of the operator, the sensory substitution display 812 provides force feedback through a modality other than reactive force, such as vibrotactile or auditory. The display elements 870 are applied to the operator in the appropriate fashion, depending on their modality. They are under the control of a control device 802, again conveniently embodied in a digital computer. The operator provides manual input signals to an input device 820, such as a levered joystick or an actuator glove, which generates signals that are used by the control device that controls the effector 840, such as digital computer 802.

Use of sensory substitution displays has proved beneficial in certain circumstances. Evaluation of the success of such use may be considered in light of certain criteria.

For instance, one measure is the number of absolute judgments that the user can make based on the substituted stimuli. Four test subjects each began by trying to distinguish among three different frequencies (or, in a separate test, amplitudes). As the session continued, the number of stimuli in a grouping were increased to four, five, six, seven, and ten different stimuli. Each subject received each stimulus within a group four times for a total of sixteen x n trials per group, where n was the number of stimuli within a group. The subjects were trained and given practice in recognizing different frequencies (or amplitudes) and assigning numbers to each stimulus in a group. Each stimulus was presented for 2.5 seconds. The subject then responded by assigning a number to that stimulus. After responding, the subject was told whether or not the response was correct, and if it was incorrect the subject was told the correct response. This process continued until all trials for that group was completed. Before each group of tones was presented, the subject was given some warm-up and practice trials in order to more easily adjust to the increased number of stimuli in the new group.

The inventor conducted channel capacity experiments using auditory stimuli varying in loudness to test the auditory display. The stimuli were spaced by equal sensation magnitude based on the sone scale (see above) between 46 to 70 db SPL. A 1000 Hz auditory tone was presented to both ears simultaneously. A channel capacity of approximately 1.76 bits representing approximately 3.4 absolute judgments was determined.

Auditory frequency may also be used to provide information about force feedback, particularly when a force can be applied to the effector in more than one direction. Test subjects were presented with a number of tones varying in frequency and were asked to assign a number to each tone. The number of tones (different pitches) were increased until the channel capacity was determined. The stimuli were spaced equally on a logarithmic scale from 28 to 3500 Hz. The tones were simultaneously presented to both ears at an intensity of approximately 65 db spl. The results show a channel capacity of approximately 2.18 bits or 4.5 absolute judgments.

Similar amplitude experiments have been conducted with the vibrotactile display discussed above. The vibrotactile display allowed amplitude modulation of a 250 Hz vibratory signal with an amplitude range of 7 to 32 db (i.e . . . 1 micron). This range was divided into sections of equal sensation magnitude for the absolute judgments experiments. The 250 Hz vibratory signal was presented simultaneously to the index finger and thumb. A channel capacity of approximately 1.76 bits representing approximately 3.4 absolute judgments was determined.

In many teleoperation tasks an operator needs to distinguish whether an applied force is increasing or decreasing over time. In order to calibrate the effectiveness of the vibrotactile and auditory displays to present this information, tests on relative discrimination to determine just noticeable differences were conducted. These tests determined the operator's ability to detect a small difference between two stimuli or a change in one stimulus. The least change in a stimulus or the least difference between two stimuli that can be detected is called the Just Noticeable Difference (JND) which is also expressed as $\Delta I$ to represent a change in intensity.

The C/MS card 540 had four bits for volume control, providing fifteen discrete loudness levels between 46 and 70 db SPL. Therefore a maximum of 14 JND's were possible. These levels were tested and all fifteen levels were easily identifiable when presented relatively from one to the next, thus providing 14 JND's for the auditory loudness display.

Similar experiments conducted with the vibrotactile display show approximately fifteen JND's within the range of zero to forty microns. To some extent, the noticeability of a difference depends on the location along the amplitude spectrum. See generally Stevens, S. S., "Mathematics, Measurement, and Psychophysics," S. S. Stevens (Ed.), *Handbook of Experimental Psychology*. New York: John Wiley & Sons (1951) and Rabinowitz, W. M., Lim, J. S., Braida, L. D., and Durlach, N. I., "Intensity Perception VI: Summary of Recent Data on Deviations from Weber's Law for 1000 Hz Tone Pulses," *Journal of the Acoustical Society of America*, Vol. 59, No. 6, June, 1976, pp. 1506–1509 (1976).

Experiments conducted by the inventor have shown, in general, that for most applications, conventional reactive force feedback allows the operator to accomplish tasks more quickly or more precisely than does the use of either auditory or vibrotactile sensory substitution force feedback. However, as has been mentioned above, reactive force feedback is expensive, and adds to the bulk, weight and complexity of systems requiring its use. Thus, for instances where a tradeoff is acceptable between speed or accuracy on the one hand, and cost, bulk, weight, complexity, etc. on the other hand, sensory substitution according to the present invention provides distinct advantages.

Vibrotactile and auditory sensory substitution force feedback show a distinct advantage over conventional reactive force feedback in the presence of a time delay, such as would be present in connection with control of an effector in outer space. As is well known, and mentioned above, use of reactive force feedback is impossible in the presence of a time delay because instabilities arise. The instabilities arise because the reactive feedback is applied to the operator's body, typically the hand, which is manipulating the input device. Thus the time delayed force feedback itself becomes an input to the system, quickly resulting in instabilities. Neither the auditory nor the vibrotactile force feedback signals result in a direct input signal to the operator's input device. Thus, the instabilities do not arise.

The vibrotactile and auditory modalities of force feedback are particularly useful in those situations where visual feedback, which is common in such systems, is unavailable, or impaired or otherwise degraded. Such situations would include underwater operations, or operations in dirty atmospheres, or operations where physical portions of the environment simply block the view of the image capture device from time to time. Moreover, high fidelity video feedback requires a significant signal bandwidth. Use of the sensory substitution according to the invention permits use of lower fidelity video feedback, requiring a smaller bandwidth.

Another reason that vibrotactile and auditory sensory substitution force feedback have an advantage over reactive force feedback is that lower force thresholds are detectable using these substituting modalities. This is because very small force signals can be amplified using the control systems, without affecting the operator's ability to provide an input signal to the system. With a reactive feedback system, if very small forces are amplified so that the feedback signal is noticeable to the operator, this necessarily means that larger forces will also be amplified, thus, making it more difficult for the operator to move the input device in the presence of these large forces. Thus, for simple tasks where all that is required is to know whether or not contact between the effector and the environment has been made, vibrotactile or auditory sensory substitution force feedback may provide operational advantages over reactive force feedback, even in the absence of a time delay and with unimpaired visual feedback.

An additional advantage of the sensory substitution modalities of force feedback is that they do not invoke in the operator's hand or arm (or other limb implementing control) a reaction. Thus, the operator can more easily control the input device, without needing to compensate for the reaction to the force feedback.

There are many applications in which increased sensitivity of force detection could be useful. For example, if a physician were performing a surgical procedure in which knowing the amplitudes of small forces being applied to the patient were helpful, sensory substitution could provide advantages. For a small force applied to the patient, an above threshold stimulus could be presented through sensory substitution. If the same technique were used with a high feedback gain for traditional force feedback, movements could be slowed or made overly difficult. High sensitivity to small forces could also be useful for a telemanipulation task involving a delicate instruments or one that requires the application of small forces for successful task completion.

The mode of implementation of a sensory substitution display depends upon the environment, effector, input device and other criteria. Considering first an auditory modality, numerous fsr's can be located at various locations on the effector. If more than two speakers are used, such as a special room fitted with many speakers at many planes relative to the operator, each fsr can be associated with a single speaker, or a combination of speakers, thereby giving a direct impression of the location of the force. The amplitude of the auditory signal can be used to indicate the amplitude of the force. Alternatively, if frequency is not used for any other indication, varying frequency can be used to indicate force amplitude.

Even with only a pair of speakers, such as headphones, signals from various fsr's spread out essentially in a plane can be mixed and sent to the pair of speakers to give the user a more complicated spatial presentation. This would be much as a pair of headphones or speakers can convey to a listener the locations of musical instruments spread out over a stage in a symphonic presentation. Frequency can be used to indicate the direction of forces applied other than in a single plane. For instance, higher frequency can indicate force being applied from above a reference plane, while lower frequency can indicate force being applied from a direction below the reference plane. The frequency cue may be used either alone or in combination with a degree of the spatial representation similar to symphonic representation discussed above.

Considering the vibrotactile modality, an example has been shown with reference to FIG. 7 where a mapping is made between the operator's hand and the elements of the effector, as discussed above. With differently shaped effectors, different numbers of sensors can be used, in different locations. For a different sort of effector, for instance a robot walking on two legs, vibrotactile displays may be connected to the operator's feet and/or legs, rather than the hand. Both hands or feet can be used. Alternatively, an array of display elements can be worn by the user, such as in a waist belt or a headband, providing 360° of direction information in a single plane, very similar to the type of information that would be provided through a similar array of audio speakers. Use of the vibrotactile display could be made by an operator with hearing or seeing impairments.

The invention may also be used to provide force feedback for the user of an artificial limb, such as a hand, gripper or foot. Taking an artificial hand as an example, force sensing sensors would reside in the fingertips, and other locations, such as the wrist. the force feedback would then be displayed, for instance, through vibrotactile displays on the patients skin. The display location could be on the stump of the limb involved, the opposite limb, if available, or other locations. This information could be useful for common tasks such as grasping delicate objects, opening doors, or finding objects in the dark.

Some of the work underlying the present invention was discussed in Massimino, M. J. and Sheridan, T. B., "Sensory Substitution of Force Feedback For the Human-Machine Interface in Space Teleoperation," delivered at the World Space Congress in Washington, D.C., Aug. 31, 1992, available from the American Institute of Aeronautics and Astronautics c/o Tasco, 9 Jay Court P,O. Box 753 Waldorf, Md. 20604, as paper No. IAF-/IAA-92-0246, which is incorporated fully herein by reference. The invention is also described in Massimino, M.J., "Sensory Substitution For Force Feedback in Space Teleoperation," submitted in partial fulfillment of the requirements for the degree of Doctor of Philosophy in Mechanical Engineering at the Massachusetts Institute of Technology, June 1992, which is also fully incorporated herein by reference.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

Having described the invention, what is claimed is:

1. An apparatus for an operator to control an effector that is remote from the operator to interact with an environment that is also remote from the operator by operator manipulation of an input device in an environment local to the operator, said apparatus comprising:

a. at least one means for sensing an amplitude of at least one force arising between the remote effector and the remote environment;
b. means for generating a force feedback signal that corresponds to the amplitude of said sensed force;
c. means for transmitting said force feedback signal from said remote environment to the location of said operator;
d. means for transducing said force feedback signal into an auditory sensory substitution signal to which the operator is sensitive; and
e. means for presenting said transduced sensory substitution signal to the auditory system of the operator such that a full range of force amplitude may be represented by said means for presenting said transduced auditory sensory substitution signal.

2. The apparatus of claim 1, said means for presenting said transducer sensory substitution signal comprising at least one acoustic sound speaker.

3. The apparatus of claim 2, said at least one acoustic sound speaker comprising a pair of sound speakers assembled as a set of headphones.

4. The apparatus of claim 1, said means for transducing comprising means for representing variations of a preselected component of said force feedback signal by variations of the amplitude of the sensory substitution auditor signal.

5. The apparatus of claim 1, said means for transducing comprising means for representing variations of a preselected component of said force feedback signal by variations of the frequency of the sensory substitution auditory signal.

6. The apparatus of claim 2, said at least one speaker comprising a plurality of speakers distributed around the operator.

7. An apparatus for an operator to control an effector that is remote from the operator to interact with an environment that is also remote from the operator by operator manipulation of an input device in an environment local to the operator, said apparatus comprising:

a. with respect to at least one force arising between the remote effector and the remote environment, said force acting along a direction, at least one means for sensing said direction of said at least one force;
b. means for generating a force feedback signal that corresponds to the direction along which said sensed force acts, said force feedback signal being characterized by at least one component having a frequency and an amplitude;
c. means for transmitting said force feedback signal from said remote environment to the location of said operator;
d. means for transducing said force feedback signal into an auditory sensory substitution signal to which the operator is sensitive; and
e. means for presenting said transduced auditory sensory substitution signal to the auditory system of the operator.

8. The apparatus of claim 7, said means for presenting said transduced auditory sensory substitution signal comprising at least one acoustic sound speaker.

9. The apparatus of claim 8, said at least one acoustic sound speaker comprising a pair of sound speakers assembled as a set of headphones.

10. The apparatus of claim 7, said means for transducing comprising means for representing variations of a preselected component of said force feedback signal by variations of an amplitude of the sensory substitution auditory signal.

11. The apparatus of claim 10, wherein said sensory substitution signal is characterized by at least two components, each having a frequency and an amplitude, said means for representing variations of a preselected component of said force feedback signal by variations of the amplitude of the sensory substitution auditory signal comprising means for representing variations of a preselected component of said force feedback signal by a combination of variations of the amplitudes of selected of the at least two components of the sensory substitution auditory signal.

12. The apparatus of claim 7, said means for transducing comprising means for representing variations of a preselected component of said force feedback signal by variations of a frequency of the sensory substitution auditory signal.

13. The apparatus of claim 8, said at least one speaker comprising a plurality of speakers distributed around the operator.

14. An apparatus for an operator to control an effector that is remote from the operator to interact with an environment that is also remote from the operator by operator manipulation of an input device in an environment local to the operator, said apparatus comprising:

a. with respect to at least one force arising between the effector and the remote environment, said force acting at a location of the effector, at least one means for sensing said location at which said force acts;
b. means for generating a feedback signal that corresponds to the location of said sensed force;
c. means for transmitting said force feedback signal from said remote environment to the location of said operator;
d. means for transducing said force feedback signal into a sensory substitution auditory signal to which the operator is sensitive; and
e. means for presenting said transduced auditory sensory substitution signal to the auditory system of the operator.

15. An apparatus for an operator having an auditory system to receive information regarding an environment remote from the operator, said apparatus comprising:

a. an input device located in an environment local to the operator;
b. an effector located in the remote environment;
c. means for generating a signal in response to manipulation of the input device;
d. means for manipulating said effector in response to said signal representative of manipulation of the input device;
e. at least one means for sensing forces arising between the effector and the remote environment;
f. means for generating a force feedback signal representing a force that corresponds to said sensed force;
g. means for transmitting said force feedback signal from said remote environment to the location of said operator;
h. means for transducing said force feedback signal into a sensory substitution auditory signal to which the operator is sensitive; and
i. means for presenting said transduced sensory substitution signal to the operator's auditory system.

* * * * *

UNITED STATES PATENT AND TRADEMARK OFFICE
CERTIFICATE OF CORRECTION

PATENT NO. : 5,451,924
DATED : September 19, 1995
INVENTOR(S) : Michael J. Massimino and Thomas B. Sheridan It is certified that error appears in the above-indentified patent and that said Letters Patent is hereby corrected as shown below:

Column 17, Line 21 replace "transducer" with --transduced-- to read: "for presenting said transduced sensory substitution signal . . ."

Column 17, Line 30 replace "auditor" with --auditory-- to read: "of the sensory substitution auditory signal."

Signed and Sealed this

Fifteenth Day of October, 1996

*Attest:*

BRUCE LEHMAN

*Attesting Officer*  Commissioner of Patents and Trademarks